June 9, 1942.　　　H. H. GORRIE　　　2,285,578
CONTROL SYSTEM
Filed July 2, 1938　　　3 Sheets-Sheet 1

Inventor
HARVARD H. GORRIE
By Raymond W. Junkins
Attorney

June 9, 1942.  H. H. GORRIE  2,285,578
CONTROL SYSTEM
Filed July 2, 1938  3 Sheets-Sheet 2

Inventor
HARVARD H. GORRIE
By Raymond W. Junkins
Attorney

Inventor
HARVARD H. GORRIE

Patented June 9, 1942

2,285,578

UNITED STATES PATENT OFFICE 2,285,578

CONTROL SYSTEM

Harvard H. Gorrie, Cleveland Heights, Ohio, assignor to Bailey Meter Company, a corporation of Delaware Application July 2, 1938, Serial No. 217,314

11 Claims. (Cl. 172—239)

This invention relates to control systems, such as for establishing or maintaining constant any desired electrical, thermal, chemical, physical, or other variable condition, or relation of conditions, through the control of a corrective agent or agents. As one example, my invention relates to control systems wherein electrical energy is utilized as a motive force for actuating devices which control the rate of application of corrective agents.

It is one object of my invention to provide a control system wherein the condition under control is rapidly restored to a predetermined value, upon deviation therefrom, without overtravel or hunting.

Another object is to control the rate of application of a corrective agent in relation to both extent and sense of the departure of the controlled variable from a predetermined condition.

A further object is to provide an apparatus responsive to the resultant of activating impulses of opposite sense, wherein such resultant determines the sense and amount of actuation applied to the valve or other mechanism under control.

Still another object is to provide an apparatus which is responsive to the controlled variable, and which through an electrically motivated corrective device restores the variable to a predetermined condition.

Still another object is to provide an improved contactor which periodically divides time into equal increments and which during each such increment initiates an electrical impulse in a given sense and of a variable time duration, and during said time interval may initiate a second electrical impulse which is of opposite sense and also of variable time duration, the said impulses being dependent upon the net value of the variable condition to which the mechanism is responsive.

These and other objects will be apparent from the following description and drawings, in which.

I have chosen herein to illustrate and describe certain preferred embodiments of my invention.

Figure 1:
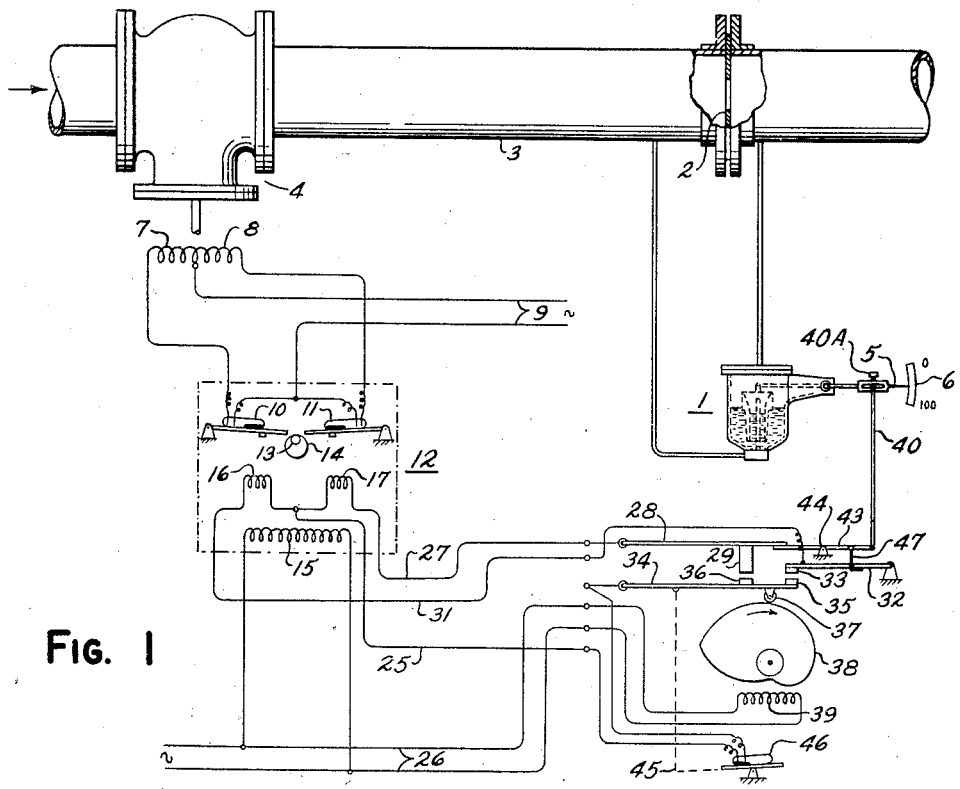
Fig. 1 is a partially diagrammatic showing of the invention in a control system.

Referring to Fig. 1, I illustrate a contacting mechanism which by its construction is adapted to initiate signals in the same time period both of a direct nature and of an inverse nature proportional to a variable condition. I further show therein a floating type of control wherein a rate of flow meter 1 is responsive to the differential pressure across an orifice 2 positioned in a conduit 3, through which a fluid such as steam or water is flowing in the direction of the arrow. The flow meter 1 is arranged to control a regulating valve 4 positioned in the conduit 3 ahead of the orifice 2 for varying the rate of flow of fluid therethrough to maintain the rate of flow at a predetermined desired value.

The flow meter 1 is a pressure differential responsive device of the type having a liquid sealed bell whose wall is of a non-uniform cross-sectional area whereby its movement is in non-lineal relation to the differential pressure produced across orifice 2, but is in lineal relation to the rate of flow of fluid through the orifice. Thus the vertical positioning of the liquid sealed bell within the flow meter, and correspondingly of the external pointer 5 positioned thereby, is in direct or lineal relation with the rate of flow of the fluid, and indicates the rate of flow relative to an index 6.

The control valve 4 for regulating or controlling the rate of fluid flow through the conduit 3 is shown only diagrammatically and represented as an electric motor actuated type wherein the windings 7 and 8 are representative of the windings of a reversing motor having the necessary gear reduction (not shown) between the motor shaft and the stem of the valve 4. The arrangement is such that if either the winding 7 or the winding 8 is energized, the moving parts of the valve 4 will be positioned in predetermined direction to cause either an increasing or decreasing of the rate of flow of fluid through the valve.

The neutral conductor of the windings 7, 8 is directly connected to a power source 9. The winding 7 is connected to the other side of the power source 9 through a mercury switch 10, while winding 8 is connected to the power source 9 through a mercury switch 11. The mercury switches 10, 11 are embodied in a relay assembly generally indicated at 12 and shown more in detail in Figs. 2, 3, 4, and 5, to be described hereinafter.

In Fig. 1 the relay 12 comprises a motor having a shaft 13 on which is located an eccentric 14 adapted to selectively position either the mercury switch 10 or the mercury switch 11, dependent upon direction of rotation of the shaft 13, and for the purpose of selectively closing the circuit from the power source 9 to either the winding 7 or the winding 8. The relay motor has a field coil 15 continuously energized across a source of alternating current 26, and two shading coils 16, 17 so arranged and proportioned that if they are simultaneously energized or deenergized then the shaft 13 is not urged to rotation in either direction. If, however, one only of the windings 16, 17 is energized, then the shaft 13 is urged to angular rotation in the one direction or the other, thereby causing a closure of circuits by either mercury switch 10 or 11. Thus the energization of the motor coils 7, 8 and thereby a positioning of the valve 4 is under control of the energization of the shading coils 16, 17 of the relay 12.

Figure 2:
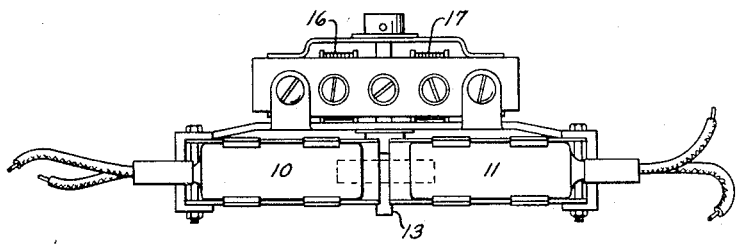
Fig. 2 is a plan view of a relay.
Figure 3:
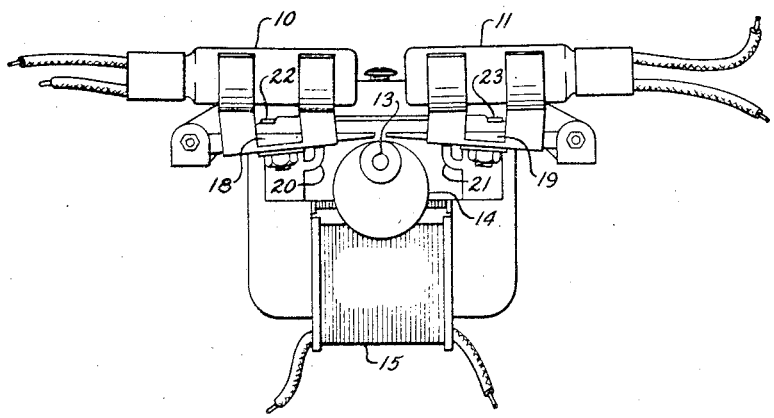
Fig. 3 is an elevation of the relay of Fig. 2.

Referring to Figs. 2 and 3, I show therein in more detail the preferred arrangement of the relay 12 in both plan and elevation. The relay per se is the invention of Paul S. Dickey et al. and forms the subject matter of United States Patent 2,231,567. It will, however, be herein described in sufficient detail to be readily understood by those familiar with the art.

The motor is of the self-starting alternating current type having shading coils 16, 17 and a continuously energized field coil 15. Direction of rotation of the shaft 13 depends upon whether the shading coil 16 or the coil 17 is short-circuited. If both of the coils are simultaneously short-circuited, or simultaneously open-circuited, then no urge to rotation occurs and the motor is of such a construction that no damage will occur thereto if it remains in a stalled condition wherein all three coils 15, 16 and 17 are continuously energized. It is commonly termed a torque motor on this account.

The mercury switches 10, 11 are positioned on and carried by pivoted leaves 18, 19 normally resting their free ends by gravity on stops 20, 21 and limited in their angular movement by stops If one of the shading coils 16, 17 is energized then the shaft 13 and correspondingly the eccentric 14 is urged to angular movement in one direction, for example in clockwise direction. Such movement causes an engagement of the eccentric 14 with the underside of the leaf 18, thus lifting the leaf 18 and the mercury switch 10 in counterclockwise motion around the pivot of the leaf until engaging stop 22. In like manner an energization of the other shading coil results in a counterclockwise angular movement of the eccentric 14, lifting the leaf 19 around its pivot in a clockwise direction. It will be observed that no complete rotation of the shaft 13 occurs, but that the eccentric moves angularly into engagement with either the leaf 18 or 19, positioning either leaf between the stops 20, 22 or 21, 23. The eccentric will remain in a stalled position until the shading coil is again deenergized, or until the other shading coil is energized. Further, the simultaneous energization or deenergization of the coils 16, 17 releases the urge to rotate the shaft 13 and the eccentric 14 falls by gravity to its lowermost or shown position of Fig. 3, whereupon the leaf and mercury switch which had been angularly held against either the stop 22 or 23 returns to its initial or normal position and in so doing opens the circuit to either the motor coil 7 or 8, as may clearly be seen in Fig. 1.

Figure 4:
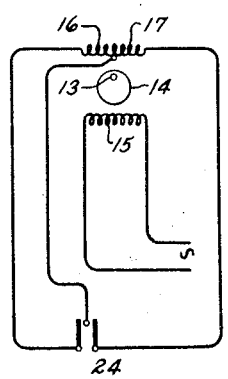
Fig. 4 is a simplified wiring diagram of the relay of Figs. 2 and 3.

Fig. 4 schematically illustrates the wiring of the relay of Figs. 2 and 3 and is in that respect quite similar to the wiring of Fig. 1. In Fig. 4 I illustrate switch members 24 for selectively energizing the shading coils 16, 17. The arrangement of Fig. 1 for accomplishing this result will be hereinafter explained.

Figure 5:
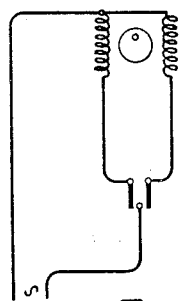
Fig. 5 is a wiring diagram of a modified type of relay.

In Fig. 5 I illustrate schematically the wiring arrangement for the use of a self-starting synchronous alternating current motor having opposed field windings such as might also be used in a relay of this type.

Referring now to Fig. 1, I provide an improved contactor arrangement for energizing the shading coils 16, 17 and thereby causing a positioning of the regulating valve 4, responsive to the value or change in value of the variable under control (in this case rate of flow of the fluid through the pipe 3). The neutral 25 of the coils 16, 17 is connected to one terminal of a mercury switch 46. The other terminal of the shading coil 17 is connected through the conductor 27 with an arm 28, pivoted (on the drawings) at its left-hand end and carrying thereon contact 29. The other side of the shading coil 16 is connected by a conductor 31 with a pivoted contact arm 32 having a contact 33 thereon, and positioned by and with the arm 43 through the agency of a link 47. A third pivoted contact arm 34 carries contacts 35, 36 adapted to engage respectively with contacts 33, 29. The arm 34 has at its free end a roller 37 adapted to engage and ride on the periphery of a continuously rotating time cam 38 positioned by a motor having a winding 39 connected directly across the power source 26.

Freely suspended from the pointer 5 is a link 40 attached at its lower end to a member 43. The member 43 is pivoted at 44 and supports at its free end the pivoted arm 28 which rests thereon by gravity and is therefore positioned representative of the position of the pointer 5. Positioned with the pivoted arm 34 through proper linkage 45 is the mercury switch 46.

In operation the cam 38 is continually revolved in the direction of the arrow by the motor 39, and thus is termed a "time cam" whereby time is divided into equal increments as represented by revolutions of the cam 38, and such increments may be in the nature of five, ten, or fifteen second durations. During each revolution of the cam 38, or during each predetermined increment of time, the roller 37, and thereby the contact arm 34, is angularly moved along a definite predetermined path depending upon the contour of the cam 38. Thus the contacts 35, 36 are angularly moved along predetermined paths and adapted in their travel to engage respectively the contacts 33, 29 at some portion of their path of movement. The extent of engagement of the contacts 35, 33 in each cycle of the cam 38 is dependent upon the position of the link 47 and upon the position of the index arm 5. The cam rise effective for engagement of contacts 33, 35 may, however, be desirably greater or lesser in extent and may be altered by the length and location of the link 47, as well as by the pivoting of the upper end of 40 to 5 through adjustment 40A.

It will be seen that the percentage of each cycle of the cam 38 during which the contacts 29, 36 are engaged will depend upon the lowermost position of the free end of the contact arm 28, which is resting by gravity upon the left-hand end of the pivoted lever 43 positioned by the flow meter 1.

As can be readily seen from the construction, I may so locate the interconnecting link 47 joining the arm 43 and 32 that contacts 29, 36 and contacts 33, 35 may engage simultaneously at say 50% rise of the time cam 38. Furthermore it is evident that the length of closure of contacts 29, 36 is directly proportional to the reading of the flow meter 1 whereas the length of closure of the contacts 33, 35 is inversely proportional to the reading of the flow meter 1.

Assume that I desire to maintain a rate of flow of fluid through the conduit 3 at say 50% of maximum flow. As illustrated in Fig. 1, the pointer 5 positioned by the flow meter 1 indicates 50% of maximum flow upon the index 6. The parts 40, 43, 47 and 32 are then in predetermined position and control thereby the position of contacts 29 and 33 relative contacts 36 and 35 respectively. Then during a revolution of the time cam 38 a certain position is reached on its periphery when contacts 29, 36 and 33, 35 will make simultaneously, thus energizing the shading coils 16 and 17 at the same instant and for the same length of time, causing no rotation of the shaft 13, and thus no energization of the coils 7 or 8 for positioning the valve 4, inasmuch as the rate of flow of fluid is as desired and no movement of the valve 4 is necessary.

Assume further that for some reason, such a demand at a further point in the conduit 3, there is a variation in the rate of flow of fluid through the orifice 2 from the desired 50% of maximum. Such variation, indicated as a change in position of the pointer 5 relative the index 6 through the agency of the flow meter 1 will cause the link 40 to be positioned upwardly or downwardly and will thereby result in a new normal position of rest of contact 29 and a new normal position of suspension of contact 33. At the new position of contact 29 engagement therewith by contact 36 will occur earlier or later, as the case may be, in each cam cycle with reference to the engagement of contacts 33, 35, thus creating a time overlap or underlap of energization of the shading coils 16, 17 so that during some slight portion of each time increment one of the shading coils, either 16 or 17, will be energized alone, with the result that the eccentric 14 will be angularly moved in a predetermined direction, actuating the mercury switch 10 or 11, and energizing the valve motor windings 7 or 8, for causing a change in the throttling position of the valve 4. More specifically, suppose that the rate of flow of fluid has increased over the desired 50% of maximum, due to some greater demand or other reason. The flow meter 1 being responsive to rate of flow will cause the arm 5 to move in a clockwise direction relative the index 6, thus moving the link 40 somewhat downwardly, the left end of the lever 43 upwardly, the link 47 and arm 32 somewhat downwardly, causing a greater breach between contacts 29 and 36 and a lesser breach between contacts 33, 35. It will then be noted that while the engagement (during one cycle of cam 38) of contacts 33, 35 is earlier than formerly, the engagement of contacts 29, 36 is proportionately later. Thus the energization of shading coil 16 will be for a greater time interval than the energization of the shading coil 17, and that overlap or extra amount of energization of the shading coil 16 relative shading coil 17 will be effective (through the relay 12) to move the valve 4 in a closing direction tending to decrease the rate of flow through the orifice 2 to the predetermined value.

Upon each revolution of the cam 38 the same action will occur, in that an incremental movement of the valve 4 will be accomplished in proper direction and amount, whereby the rate of flow of fluid is decreased toward the predetermined value. As the rate of flow decreases, the flow meter 1 and parts moved by it will be returned toward the predetermined value, and thus contact 29 will be lowered and contact 33 will be raised to their former positions, with the result that successive cycles of the time cam 38 will cause the overlap of the impulses or the energization of one shading coil alone to be progressively lesser in extent as the rate of flow approaches the predetermined value. Thus the action is asymptotic in approaching the predetermined desired condition (in this case rate of flow).

It will be evident that if, for example, the rate of flow were to decrease from that desired, then the action would in general be the reverse. That is, the contact 29 would have a normal or gravity position lower than previously and would be engaged by the contact 36 earlier in the cycle of the cam 38 while the contact 33 would have a position higher than previously and thus the shading coil 17 would be energized ahead of the shading coil 16 and the overlap of energization of the shading coils 16, 17 would then be in a direction to result in an opening movement of the valve 4 for increasing the rate of flow through the conduit 3.

It will be seen that the net effect or positioning of the controlled member (valve 4) for regulating the variable (fluid flow in this case) is for each time interval (represented by a revolution of cam 38) of a duration determined by the overlap in one direction or the other of engagement of the contacts 33, 35 relative to the contacts 29, 36. The resulting motion is in direction and amount dependent upon overlap or underlap, and is in effect an algebraic summation of the time length of contacts or impulses caused by the engagement of the contacts 33, 35 and the contacts 29, 36.

The energization of motor winding 7 or winding 8 will bear a time relation to the extent of flow departure from predetermined value dependent upon length and location of interconnecting link 47. For example, the length of link 47 and the relative moment arms of arm 43 and arm 32 (determined by the points thereon to which 47 is pivoted) will determine the rate of change in time length of effective overlap contact with extent of departure of the variable (which positions 40) from predetermined value.

Figure 7:
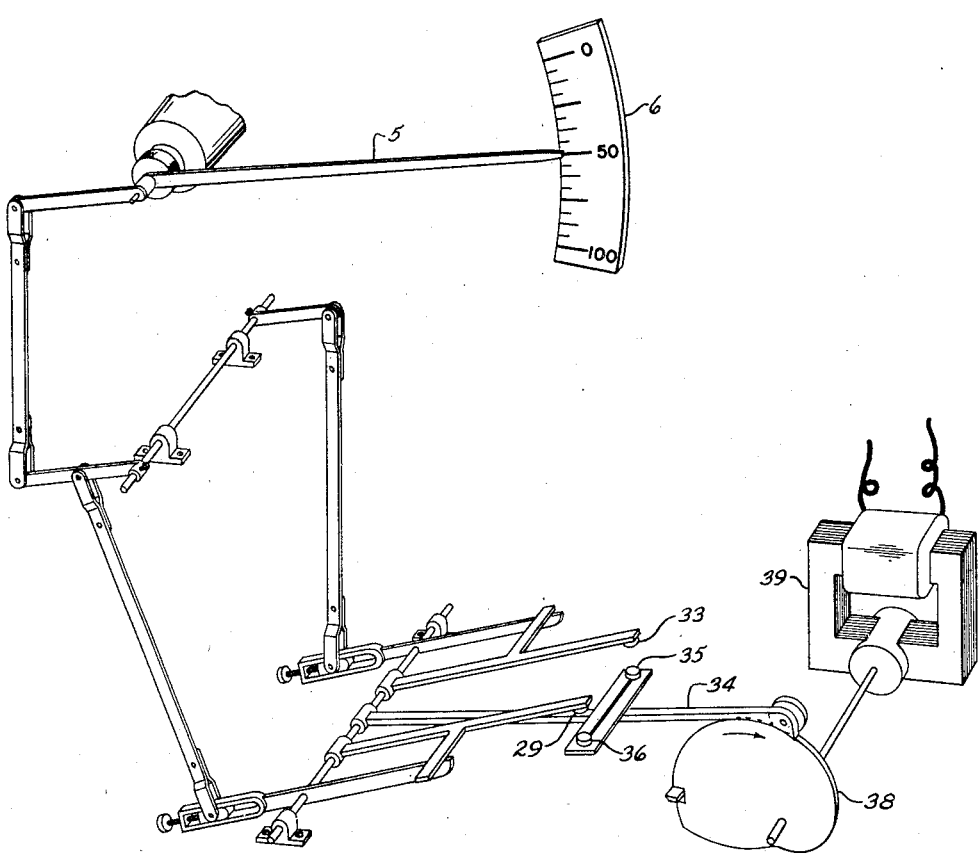
Fig. 7 is a perspective view of a preferred embodiment of my invention.

Schematically shown and in perspective, Fig. 7 fundamentally illustrates the variable contactor wherein time is divided into equal increments by the periodic rotation of cam 38. Riding its periphery is the contact arm 34 having thereon contacts 36, 35 which contacts under certain conditions, represented by index arm 5, meet contacts 29, 33 respectively earlier or later as the case may be. The formation and the length of contacts 29, 36 is directly proportional to a variation in a variable condition which variation is represented by the index arm 5 upon the index 6, and the formation and the length of contacts 33, 35 is inversely proportional to the variation of the same condition. The breach between either of the sets of contacts is determined simultaneously, and is representative of a change in the variable condition; while the breach between one set of contacts increases, the other will decrease. Either set of contacts may close first and the length of time of closure before the other set of contacts close is the overlap or underlap, or that length of impulse equal to the difference in the time of making between the two sets of contacts. Such impulse is then imparted to a corrective agent, such as the reversible motor 7, 8 controlling the extent and direction of movement of the valve 4.

In any contactor of the general type of Fig. 1 wherein electric circuits are controlled by open contact points there is the danger or possibility of the contact points becoming dirty, or arcing, or burning, and thus varying a definite and desired time of engagement and disengagement of the contacts. To obviate such difficulty I have provided that the neutral conductor 25 connecting the shading coils to the contact arm 34 be carried through the mercury switch 46, positioned through the link 45 and the contact arm 34, by the cam 38. Thus I provide that during each cycle of revolution of the cam 38 at a predetermined point the mercury switch 46 will break the power connection to the contact arm 34 and thus will simultaneously deenergize both the shading coils 16, 17. So in general I have an arrangement wherein during each time interval, as represented by a cycle of revolution of the cam 38, there is an engagement between the contacts 33, 35 and between the contacts 29, 36, in each case for a portion of said definite time interval, and with the provision that both sets of these contacts are broken from the contact arm 34 simultaneously through the mercury switch 46. If conditions are as desired, then the engagement of the contacts 33, 35 and 29, 36 will be simultaneous, and inasmuch as they are deenergized together, the closure of the two sets of contacts will be for the same increment of time during that cam revolution. If the value of the variable departs from the predetermined value, then the engagement of the contacts 33, 35 remains as previously, on a time length basis. But the closure of the contacts 29, 36 will be of a greater or shorter duration and the overlap between the two contact closures on a time basis provides a net closure in proper direction and extent to motivate the corrective agent as may be necessary to bring the time length of the contact closures again into agreement.

It will be seen that while in the preferred embodiment I preferably initiate the contact closures at the same or varying instants, but disengage the two sets simultaneously; I may equally as well arrange so that the engagement of the two sets of contacts is simultaneous but the disengagement may be at different times. Furthermore, I might so arrange the contactor that neither the engagement or the disengagement of the two sets of contacts will be simultaneous. In any event the preferred arrangement of my invention is one wherein impulses of opposite sense, and which may be of the same or different time durations, are applied in opposing manner in an arrangement where the algebraic summation or net result is made effective for useful work.

Figure 6:
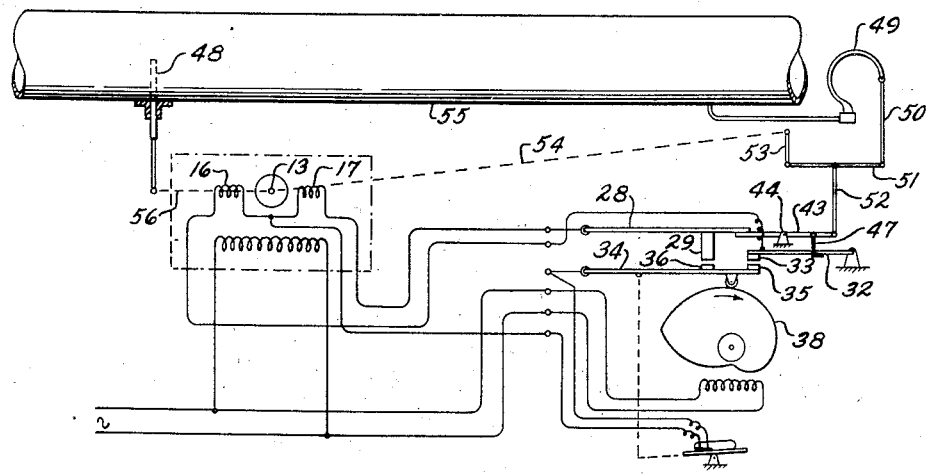
Fig. 6 is a partially diagrammatic adaptation of the invention in a control system.

As previously mentioned, the arrangement of Fig. 1 is a floating control wherein the valve 4 may assume any position so long as the desired rate of flow through the orifice 2 is attained. Contra to this the arrangement of Fig. 6 is in the nature of a positioning control wherein there is a definite interrelation between the position of the valve or damper member 48 and the value of the pressure as indicated by the pressure responsive device 49. Freely suspended from the Bourdon tube 49 is a link 50 pivoted at its lower end to a floating member 51 to which is also pivoted a vertical link 52. To the floating member 51 is also pivoted a substantially vertical member 53, and to link 52 is attached the arm 43.

In the arrangement of Fig. 6 a motor having the shading coils 16, 17 is not utilized to position, by the shaft 13, mercury switches 10 and 11, but is directly connected to position the damper 48 through suitable gear reduction or other means indicated diagrammatically at 56 and is at the same time adapted to position through gearing or linkage 54 the tie-back member 53.

In the present instance the shaft 13 may be angularly moved in one direction or the other through one or more complete revolutions as may be dictated by the sense and extent of the overlap of the electrical impulses applied to the shading coils 16, 17.

The damper 48 positioned across the conduit 55 controls pressure within the conduit and such pressure is effective within the Bourdon tube 49 for positioning the link 50. If the pressure is as desired, the position of the links 50, 53 is such that a central point on the beam 51 from which depends a member 52 is at a predetermined or neutral position. Such position of the member 52 dictates that the time length of circuit closure to the shading coils 16, 17 will be uniform and simultaneous, so that there is no resulting overlap or underlap of energization of the shading coils, and therefore no resulting movement of the damper 48. If, however, for some other reason the pressure within the conduit 55 varies, as for example to increase, then the Bourdon tube would tend to straighten, raising the link 50 and thereby the member 52, which would result in a circuit closure to the shading coil 17 of a shorter duration than that to the shading coil 16. The overlap of energization of shading coil 16 relative to shading coil 17 would cause rotation of the shaft 13 in proper direction and amount to position the damper 48 inwardly across conduit 55, causing a reduction in pressure therein and which effective upon Bourdon tube 49 would tend to return the linkage to a predetermined position. Simultaneously, the rotation of the shaft 13 through linkage 54 positions the member 53 in an upwardly direction as a "tie-back" to return the member 52 to its initial position.

In this type of geared or positioning control the link 50 will never return exactly to a predetermined value, but there will be a geared range wherein a certain amount of travel of the link 50 will be equivalent to complete, or substantially so, travel of the damper 48, and in which range there will be a definite position of the damper for every motion of link 50.

The essential elements of my invention as herein described are embodied in the contactor and the relay arrangement of Figs. 1, 6, and 7, wherein the relay 12 controls the regulating reversible motor operating the valve 4, and therein it becomes a power means itself controlling the direction and extent of damper 48, and simultaneously used as a tie-back.

In general, I have provided a preferred contactor arrangement and system wherein I periodically initiate impulses of a variable time duration and during the same period initiate other impulses of the same or different duration depending upon the then value of a variable. During each time period the impulses are algebraically added and the overlap or underlap comprising the net as to direction and extent is then made effective as may be desired. It will be seen that the system provides a ready means for remotely telemetering or telemetrically transmitting signals whose direction and extent depends upon values and conditions at the transmitting end and which may be put to use at the receiving end for indicating, recording or various controlling purposes.

While I have chosen to illustrate and describe certain preferred embodiments of my invention it is to be understood that I am not to be limited thereby but only as to the claims in view of prior art.

What I claim as new, and desire to secure by Letters Patent of the United States, is:

1. In a telemetric system, a transmitter cyclically originating an impulse of a variable time duration and a second impulse of a variable time duration in the same time period, a second transmitter responsive to the impulses of the first transmitter initiating signals of a time length equal to the algebraic summation of the impulses from the first transmitter, and receiving means simultaneously varying the lengths of both said impulses.

2. A transmitter for a telemetric control system comprising, a movable member displaceable from and to an initial position, means including a second member cyclically moved through a predetermined course cooperating with said first named member for cyclically producing a first electric impulse of a time duration directly related to the displacement of said first named member from the initial position and simultaneously with said first electric impulse a second electric impulse of a time duration inversely related to the displacement of said member from the initial position.

3. A transmitter for a telemetric control system comprising, a movable member displaceable from and to an initial position, a second and a third member operated by said first member and displaced in opposite directions an amount corresponding to changes in the displacement of said first named member from the initial position, and a cyclically operated member for engaging said second and third members for a time increment corresponding to their displacement from a given position.

4. A transmitter for a telemetric control system comprising, a movable member displaceable from and to an initial position, a shaft, a second and third member operatively connected to said first member and angularly positioned about said shaft in opposite directions in correspondence with changes in the displacement of said first member from the initial position, a contact member mounted on said shaft, and cyclically operable means for periodically moving said contact member from a position of rest into engagement with said second and third members for a time increment corresponding to their displacement from said position of rest.

5. A telemetric transmitter comprising a movable member displaceable from and to an initial position, cyclically driven means for producing signals of a time duration directly proportional to the displacement of said member from the initial position, and cyclically driven means for producing signals simultaneously with said first named signals having a time duration inversely proportional to the displacement of said member from the initial position so that the signal of shorter duration is included in the time span of the signal of longer duration.

6. A telemetric transmitter comprising a movable member displaceable to and from a neutral position, cyclically driven means, means actuated by said movable member and by said cyclically driven means for originating a signal in each cycle of operation at a time displacement after the origin of each cycle directly proportional to the displacement of said member from the neutral position, means actuated by said movable member and by said cyclically driven means for originating a signal in each cycle of operation at a time displacement after the origin of each cycle inversely proportional to the displacement of said member from the neutral position, and means for simultaneously terminating both said signals.

7. A telemetric transmitter as defined in claim 6 in which the means for simultaneously terminating both signals is cyclically driven.

8. A telemetric transmitter as defined in claim 6 in which the means for simultaneously terminating both signals is actuated by said cyclically driven means.

9. A telemetric control system comprising in combination, a movable member displaceable to and from an initial position, a motor having opposed windings, cyclically driven means, means actuated by said movable member and by said cyclically driven means for energizing one of said windings for a time duration directly proportional to the displacement of said movable member from the initial position and for simultaneously energizing the other of said windings for a time duration inversely proportional to the displacement of said movable member from the initial position so that said motor moves in one direction or the other selectively in accordance with which winding is energized the longer.

10. A telemetric control system comprising in combination, a movable member displaceable to and from an initial position, cyclically driven transmitting means for originating signals of a time duration directly proportional to the displacement of said member from the initial position and for originating signals of a time duration inversely proportional to the displacement of said member from the initial position, and receiver means jointly responsive to both said signals.

11. A transmitter for a telemetric control system comprising in combination, a member having a neutral position, means for displacing said member from its neutral position, cyclically driven means, transmitting means including a member positioned by said movable member and a member positioned by said cyclically driven means for originating a first and a second electric signal each having equal time duration when said first mentioned member is in its neutral position, the time duration of said first signal becoming progressively longer as said first-mentioned member is displaced from its neutral position in one sense and progressively shorter as said first-mentioned member is displaced from its neutral position in opposite sense, and said second ignal varying in opposite relation to the displacements of said first-mentioned member from its neutral position in the given senses.

HARVARD H. GORRIE.